United States Patent [19]
Gold et al.

[11] Patent Number: 4,667,695
[45] Date of Patent: May 26, 1987

[54] PRESSURE REGULATING AND ON-OFF VALVE

[76] Inventors: Harold Gold, 3645 Tolland Rd., Shaker Heights, Ohio 44122; Tadeusz Budzich, 80 Murwood Dr., Moreland Hills, Ohio 44022

[21] Appl. No.: 862,156

[22] Filed: May 12, 1986

Related U.S. Application Data

[63] Continuation of Ser. No. 616,718, Jun. 4, 1984, abandoned.

[51] Int. Cl.[4] .............................................. G05D 16/00
[52] U.S. Cl. ................... 137/486; 137/489.5; 137/490
[58] Field of Search ..................... 137/486, 489, 489.5, 137/490, 491, 82, 84, 85; 251/282, 30

[56] References Cited

U.S. PATENT DOCUMENTS

| | | | |
|---|---|---|---|
| 2,309,848 | 2/1943 | King | 137/489.5 X |
| 2,747,606 | 5/1956 | Adams et al. | 137/489 |
| 3,442,485 | 5/1969 | Reynolds | 251/282 X |
| 3,482,588 | 12/1969 | Kreuter | 137/85 |
| 3,740,174 | 10/1973 | Amtsberg | 251/282 X |
| 4,314,585 | 2/1982 | Nishimiya | 251/282 X |
| 4,431,020 | 2/1984 | Kowalski | 137/486 X |
| 4,476,893 | 10/1984 | Schwelm | 137/486 |

Primary Examiner—Alan Cohan

[57] ABSTRACT

A two stage relief valve, in which the pilot flow is limited by an active flow control element to a specific maximum predetermined level, to extend its maximum operating pressure range and to improve its operating characteristics. The downstream orifice may be fully open and of a fixed area type, or may be controlled by a spring or solenoid biased member. With the downstream orifice solenoid or stepper motor operated, the relief pressure level becomes responsive to an electrical input signal.

8 Claims, 14 Drawing Figures

PRESSURE REGULATING AND ON-OFF VALVE

This application is a continuation of application Ser. No. 06/616,718, filed June 4, 1984, now abandoned.

BACKGROUND OF THE INVENTION

This invention relates to pilot operated relief valves that provide either maximum pressure limiting or provide pressure regulation under varying flow rates and over a selectable range of pressures. An inherent property of the present invention relates it further to pilot actuated on-off valves.

Pilot operated, or as it is frequently called, "two stage valves" are employed where pressure regulation above approximately 1000 psi is required. Single stage valves, except in very small sizes, cannot operate in this high pressure range primarily because of the limit imposed by loading spring stress. Very stiff springs, which could provide the loading force, cannot be used because of the very poor pressure regulation that results. In pilot operated, pressure regulating valves, a controlled pressure is employed to provide substantially all of the loading force; and consequently, the loading spring can be lightly stressed even at very high pressures. In such valves of the prior art, the loading pressure is provided by an orifice fed, pilot relief valve that is in parallel with the pressure regulating valve. The loading spring stress of the pilot relief valve limits the maximum pressure to approximately 5000 psi. The present invention is directed toward means for raising the maximum pressure and for eliminating the clogging, silting, stability, pressure range and droop difficulties associated with highly spring loaded pilot relief valves. The properties of this invention also permit the use of relatively low force pilot relief valve springs and actuators to control the pressure setting, even at the highest pressure.

Solenoid actuated on-off valves in current use employ a spring biased first stage valve and a second stage pilot circuit that is the same as employed in the two stage pressure regulating valve described above, with the exception that the second stage valve is not configured for flow area modulation but for switching between maximum flow area and zero. At maximum flow area the first stage valve is driven open by system pressure; and at zero flow area the first stage valve is held closed by the spring bias and the area unbalance that results from the first stage seating shoulder. If the pilot valve of this circuit were configured to provide means for setting fixed orifice areas the first stage valve would reach an equlibrium position at a system pressure that corresponds to the set orifice area, the system pressure increasing as the orifice area is set to smaller values. This pressure regulating system eliminates the problems and limitations of the the spring biased pilot valve; but, it is not in use in pressure regulating systems because the droop in regulation is excessive.

SUMMARY OF THE INVENTION

It is an object of this invention to provide an improved two stage pressure relief valve that can regulate pressure over a range of pressures extending from approximately 100 psi to substantially higher than 5000 psi, without instability and without significant change in pressure over a wide range of flow through the valve.

It is another object of this invention to provide a two stage relief valve that will regulate pressure over a wide range of flow through the valve without significant variation of pressure, and with second stage valve providing a fixed orifice area.

It is another object of this invention to provide a two stage relief valve that will regulate pressure over a wide range of flow through the valve without significant variation of pressure, and in which the flow area provided by the second stage valve is held constant and is adjustable by a screw device.

It is still another object of this invention to provide a two stage relief valve that will regulate pressure over a wide flow range without significant pressure variation and in which the flow area of the second stage valve is substantially balanced against its upstream pressure and is variable by a spring opposed solenoid mechanism.

It is still another object of this invention to provide a two stage relief valve that will regulate pressure over a wide flow range without significant pressure variation, and in which the flow area is not balanced against its upstream pressure and in which the pressure force is opposed by a spring mechanism.

It is still another object of this invention to provide a maximum pressure limiting on-off solenoid valve for rapidly unloading the system pressure to a certain mimimum predetermined level.

Briefly, the foregoing and other objects and advantages of this invention are accomplished by providing a novel two stage pressure relief valve in which the pilot circuit inlet orifice of the prior art is replaced by an active flow regulator. The very important benefits of this pilot flow regulator and the novel implementations that are made possible by its use will be fully described in conjunction with the following drawings.

Additional objects of this invention will become apparent when referring to the preferred embodiments of the invention as shown in the accompanying drawings and described in the following description.

DETAILED DESCRIPTION OF THE INVENTION

Figure 1:
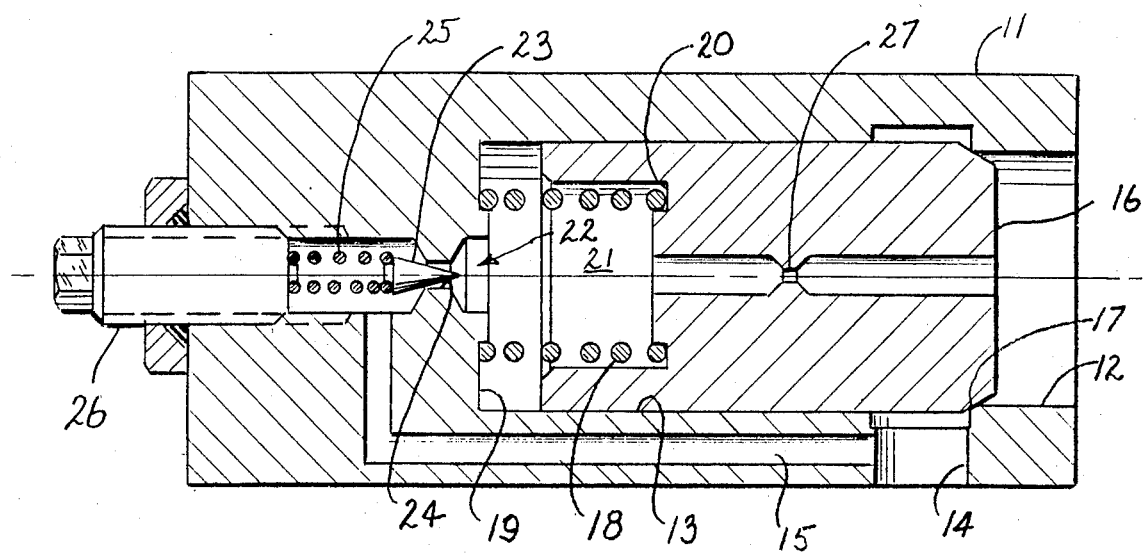
FIG. 1 is a cross-sectional, schematic view of a mechanism that is characteristic of the prior art in two stage pressure regulators.

An assembly that presents the principal elements of a two stage pressure regulator of the prior art is illustrated in FIG. 1. This figure is introduced in order that the improvements provided through the present invention can be more readily explained and understood. In FIG. 1, housing 11 contains bores 12 and 13, discharge passage 14 and pilot drain passage 15. Piston 16 fits slidably in bore 13 and seats on shoulder 17 which is forced by the intersection of bores 12 and 13. Spring 18 is compressed between wall 19 of housing 11 and wall 20 of piston 16. Chamber 21, which is formed between walls 19 and 20, communicates with discharge passage 14 through pilot relief valve 22 and passage 15. Conical piston 23 is driven into bore 24 of pilot relief valve 22 by spring 25. Adjusting screw 26 provides the means for varying the force exerted on piston 23 by spring 25. Chamber 21 communicates with inlet bore 12 through orifice 27.

In the operating state, the pressure in chamber 21 is greater than the pressure in discharge bore 14, by an amount sufficient to overcome the force exerted by spring 25 and hold conical piston 23 away from contact with the adjacent edge of bore 24. In this state, flow is established in the pilot circuit comprising orifice 27, orifice 22 and passage 14. The pressure drop across orifice 27 acts on the ends of piston 16 and generates an opening force. Piston 16 reacts to this opening force, the closing force of spring 18 and the closing force generated by the change in momentum of the fluid as it passes from bore 12 into passage 14 (flow force); and, piston 16 moves axially until an equilibrium is reached between these forces. Piston 16 moves from one equilibrium position to another as the flow rate from bore 12 into passage 14 varies. Upon an increase in this flow rate both the closing forces, spring 18 force and flow force, increase and as a consequence, the pressure drop across orifice 27 and the pilot flow rate increase. Conical piston 23 reacts to this pilot flow rate increase by moving axially until its pressure, flow and spring forces are in equilibrium. As in the case of the first stage valve, the pressure drop across relief valve 22 increases as the pilot flow increases. This increased pressure drop increases the closing force on piston 16 which produces a further increase in pilot flow rate. It is obvious that this escallating effect could readily produce an instability. Furthermore, the force equilibrium that is reached by the two valve stages produces a combined pressure regulation error or droop that is significantly greater than that produced by the spring and flow forces on the first stage alone. The instablity is avoided by the use of a high rate for spring 25, but increasing the rate of the spring increases the droop of the second stage. It is frequently a practice to employ a very small orifice at 27. Reducing the size of orifice 27 is stabilizing because it reduces the pilot flow rate change produced by an increase in pressure drop, but it requires fine filtering to prevent clogging. In addition, the flow area produced by pilot relief valve 22 must be correspondingly reduced, which factor contributes to clogging by very fine particles, known as silting.

In solenoid actuated, on-off valves of the prior art, the variable orifice shown at 22 is configured to be spring and solenoid operated to position conical piston in either of two positions i.e.: seated or fully retracted. In the seated position, the pressure in chamber 21 is the same as the pressure in bore 12 and piston 16 is held seated at shoulder 17 by the combination of the force of spring 18 and the unbalance in opposite piston end areas formed by shoulder 17. When conical piston 23 is withdrawn from its seated position to full opening, the pressure drop due to the pilot flow across orifice 27, acting on the ends of piston 16, drives the piston to wall 19 and the valve remains fully opened. If spring 25 were made rigid, linking conical piston 23 to screw 26, conical piston 23 could be held at any position between seating to maximum opening. At a small intermediate position the pressure drop across orifice 27 would not be sufficient to drive piston 16 to maximum opening and therfore piston 16 would find an equilibrium position, intermediate between full open and seated. This regulator avoids the problems associated with the spring, pressure and flow force sensitive pilot relief valve described above but the variation of regulated pressure with flow through the first stage valve, or droop is excessive. It can be shown that this droop is the droop due to spring and flow forces on the first stage valve multiplied by a factor KD which is equal to $$KD = 1 + (a_{27}/a_{22})^2 \qquad (1)$$

where:

a₂₇—area of orifice 27
a₂₂—area of orifice 22

The ratio $(a_{27}/a_{22})^2$ increases as the regulated pressure increases and for this reason the droop becomes very large at pressures above 2000 psi.

Figure 2:
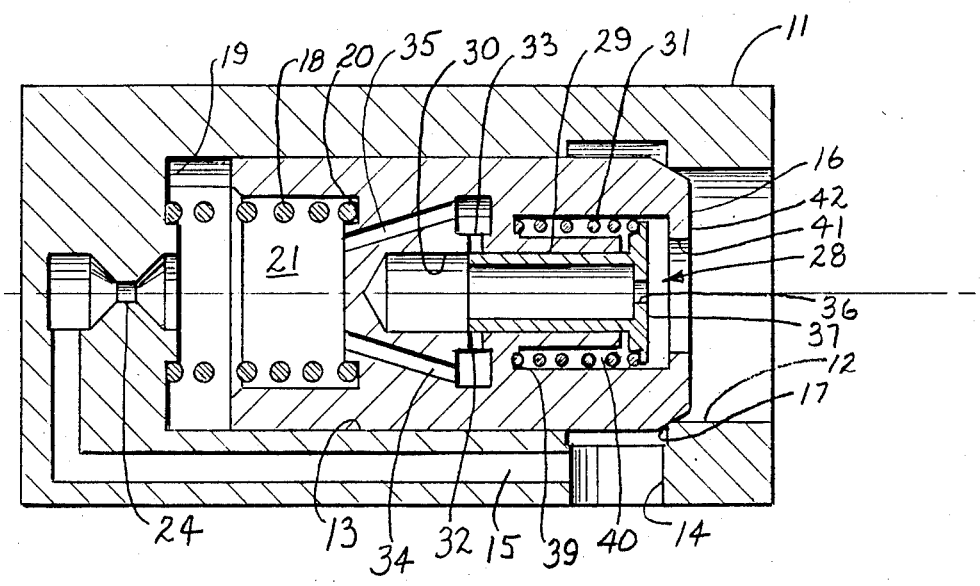
FIG. 2 is a cross-sectional, schematic view of a mechanism, in accordance with this invention and in which a two stage pressure regulator incorporates a pilot inlet flow regulator and a fixed pilot discharge orifice.

An assembly that presents the principal elements employed in this invention is illustrated in FIG. 2. Parts having the same function are identified by the same number in FIGS. 1 and 2. In FIG. 2, housing 11 contains bores 12 and 13, discharge passage 14 and pilot drain passage 15. Piston 16 fits slidably in bore 13 and seats on shoulder 17 which is formed by the intersection of bores 12 and 13. Spring 18 is compressed between wall 19 of housing 11 and wall 20 of piston 16. Chamber 21, which is formed between walls 19 and 20 communicates with discharge passage 14 through orifice 24 and passage 15. Flow regulator 28 is housed in piston 16 and comprises piston 29, bore 30 and spring 31. Piston 29 passes over holes 32 and 33 which communicate with chamber 21 through passages 34 and 35. Inlet orifice 36, in the end wall 37 of piston 29 communicates chamber 38 in piston 29 with bore 12. Spring 31 is compressed between end wall 39 of annular chamber 40 and the diametral extension of wall 37. The diameter of bore 41 in wall 42 of piston 16 is smaller than the extended diamaeter of wall 37, which condition prevents excess extension of piston 29 by the action of spring 31 or other forces. In the flowless state, wall 37 of piston 29 is pressed against wall 44 and spring 18 presses piston 16 against shoulder 17.

When the pressure in bore 12 is raised above the pressure in discharge passage 14, a flow is first established through the pilot path defined by orifice 36 holes 32 and 33 and orifice 24. When, upon further increase of the pressure difference between bore 12 and discharge passage 14, the pilot flow rate reaches the flow regulator limit, piston 29 is positioned over holes 32 and 33 to hold the pressure drop across orifice 36 to a constant value. Through this well known action, the pilot flow rate is held constant. Within realizable fits of piston 29 in bore 30, the pressure limit over which this type of flow regulator can function is greater than is required for this purpose. Another important feature of this type of regulator is that the flow force effect can be cancelled by the proper selection of the spring rate of spring 31. These two considerations make control of the pilot flow rate to a very constant value physically realizable under all conditions of operation of this use. The steady state pressure in chamber 21, under constant pilot flow rate and constant area of orifice 24, is constant and is independent of variations in the pressure in bore 12. The value of this constant pressure is, from the well known orifice equation, as follows.

$$P_{21} = K(Q_p/a_{24})^2 \quad (2)$$

where:
  P₂₁—pressure in chamber 21
  K—dimensional constant
  Qp—pilot orifice rate
  a₂₄—area of orifice 24

Figure 3:
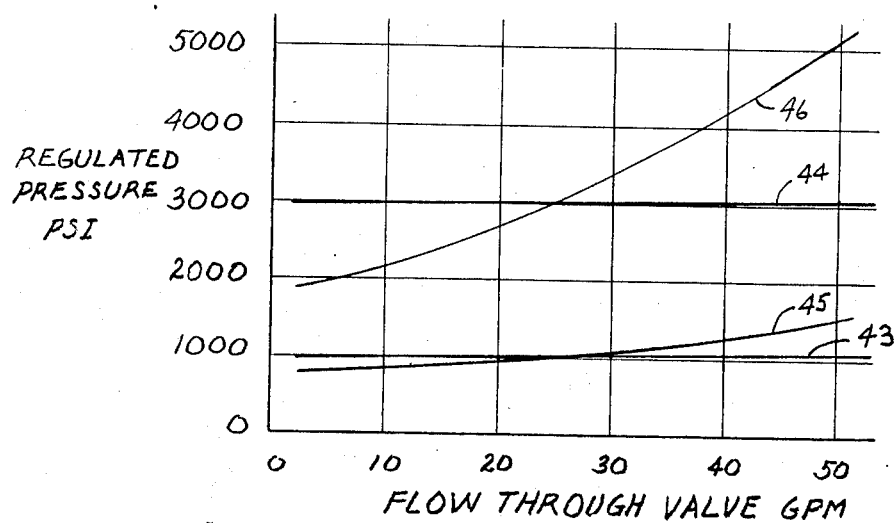
FIG. 3 is a graph illustrating the droop characteristics of a pressure regulator having pilot with an inlet flow regulator and fixed discharge orifice and the droop charcteristics of a pressure regulator having a pilot with a fixed inlet orifice and a fixed discharge orifice.
Figure 4:
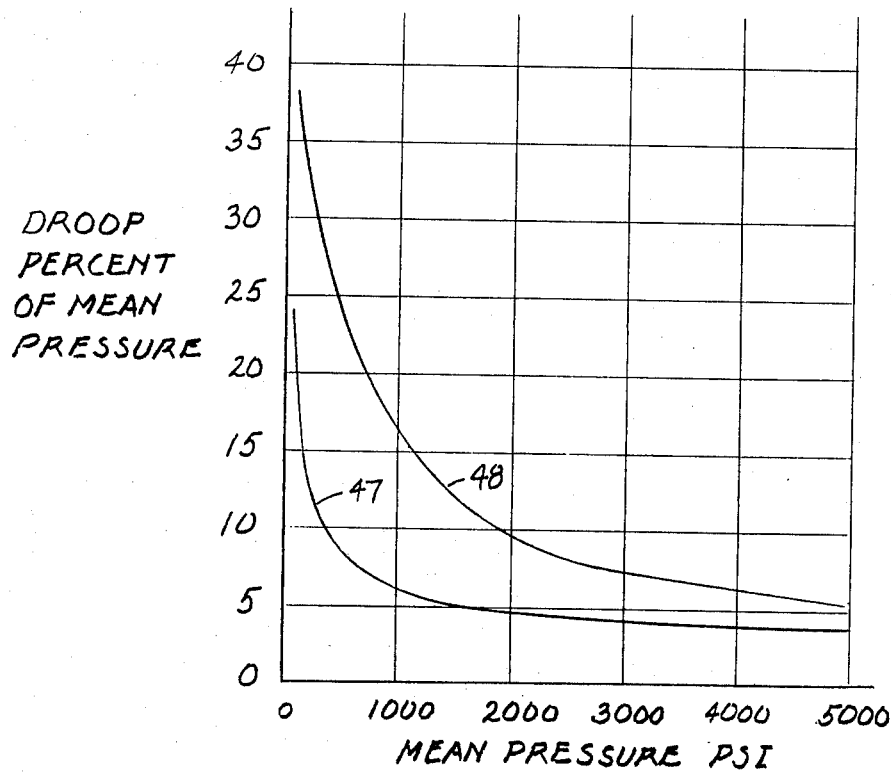
FIG. 4 is a graph illustrating the droop characteristics of a pressure regulator having a pilot with an inlet flow regulator and a fixed discharge orifice and the droop characteristics of pressure regulator having a pilot with a fixed inlet orifice and a spring loaded, pressure regulating discharge valve.

As in the case of the prior art regulator described above, piston 16 moves from one axial force equilibrium position to another as the flow rate from bore 12 to passage 14 varies. Because the pressure in chamber 21 is the same at each equilibrium position, the pressure change in bore 12 is that due only to the change in the force of spring 18 and the change in flow force. FIG. 3 shows the characteristic variation of pressure in bore 12 with first stage flow rate, of a regulator with a pilot inlet flow regulator and a fixed pilot discharge orifice (lines 43 and 44) and the characteristic pressure variation of a regulator with a pilot inlet orifice and a fixed pilot discharge orifice (lines 45 and 46). The dramatic improvement provided by the pilot inlet flow regulator is clearly evident, particularly in the high pressure range. Fig. 4 shows the characteristic rate of pressure variation with first stage flow rate (droop), as a percent of mean regulated pressure of a regulator with a pilot inlet flow regulator and a fixed discharge orifice (line 47) and the droop of a regulator with a pilot inlet orifice and a pilot discharge relief valve (line 48). The improvement provided by the system of FIG. 2 over that provided by the system of FIG. 1 that is shown in FIG. 4 is of a smaller magnitude than that shown in FIG. 3, but is nevertheless significant. Furthermore, other advantages and improvments that are made possible by the system of FIG. 2 will become apparent as the description of this invention proceeds.

While the droop of a pressure regulator operating in accordance with the system of FIG. 2 is very low at all pressures, it is obvious that means for adjusting the area of orifice 24 are required if pressure selection is required. The area of orifice 24 can be changed by substitution or by use of an adjustable element inserted in the orifice. The inherent characteristic that the variable element may be made pressure and flow force independent permits a wide variety of valve elements and actuators to be applied.

Figure 5:
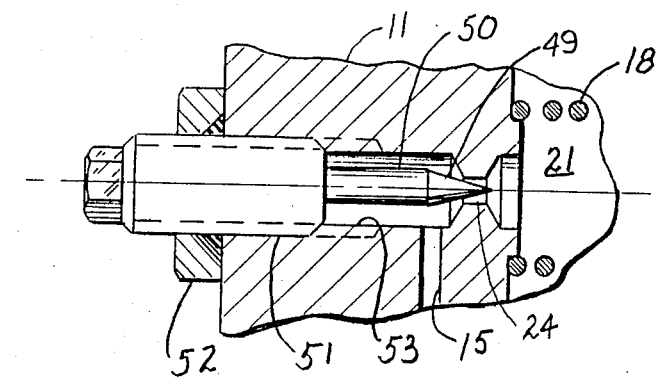
FIG. 5 is a fragmentary cross-sectional, schematic view of a screw mechanism for manually adjusting the flow area of the pilot discharge orifice of the mechanism of FIG. 2.

FIG. 5 illustrates one of the simplest of valve and actuator mechanisms that can be applied. Conical valve element 49 is held substantially concentric in orifice 24 by rod 50 and screw 51. Screw 51 mates with threads in body 11 and is secured in position by sealing locknut 52. Bore 53 provides the flow path around rod 50 to passage 15. The regulated pressure level is manually adjustable through movement of conical element 49 into or out of orifice 24. Inward movement raises the pressure. Obviously, if conical element 49 were to seat on the edge of orifice 24, the pressure would rise indefinitly. Thus to prevent over pressure, a limit on the smallest flow path between cone 49 and orifice 24 is required. This limit can be provide by making the diameter of rod 50 less than the diameter of orifice 24, or by providing a thread insertion stop.

Figure 6:
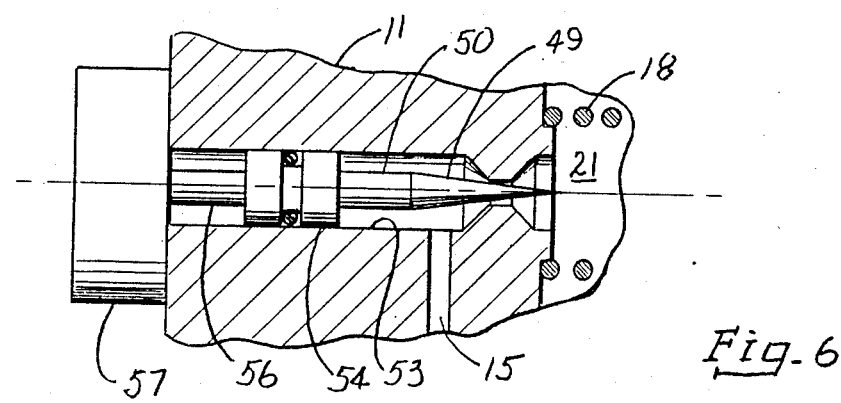
FIG. 6 is a fragmentary cross-sectional, schematic view in which the screw mechanism shown in FIG. 5 is incorported in a stepper motor assembly and whereby the flow area of the pilot discharge orifice of this invention can be incrementally changed through an electric pulse.

FIG. 6 illustates the use of an electric stepper motor to position a valve element and thereby adjust the flow area of an orifice. As in FIG. 5, a conical valve element 49 is positioned in orifice 24 and is coupled to rod 50. Rod 50 is coupled to seal piston 54 which mates slidably with bore 53. Piston 54 is coupled on its other side to output shaft 56 of stepper motor lead screw combination 57. Motor 57 is fastened to housing 11 in a suitable manner and is configured to provide increments of axial displacement of shaft 56. The angle of cone 49 is set to match the travel range of motor 57.

Figure 7:
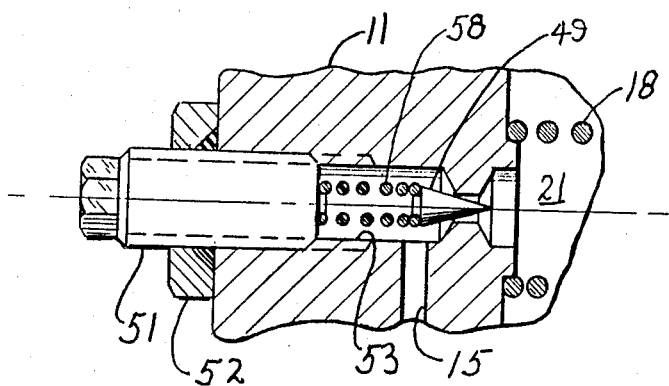
FIG. 7 is a fragmentary cross-sectional, schematic view of a screw adjustable spring loaded pressure regulating valve of the prior art for regulating the effective flow area of the discharge orifice of the mechanism of FIG. 2.

FIG. 7 illustrates the use of a manually adjustable, spring loaded, conical valve element similar to that used with regulators as shown in Fig. 1. Conical element 49 is driven toward orifice 24 by spring 58 by a force that is adjustable through screw 51. Screw 51 mates with threads in body 11 and is secured by sealing locknut 52. Conical element 49 finds a position in which the closing forces, spring and flow force, are in equilibrium with the opening force generated by the pressure in chamber 21. Because of the constant pilot flow rate of the flow control valve of FIG. 2, the equilibrium position is always the same as a rigidly positioned conical element, at the same regulated pressure. For this reason, this type of valve cannot induce droop or instability as it can in the prior art regulator represented by the mechanism of FIG. 1.

Figure 8:
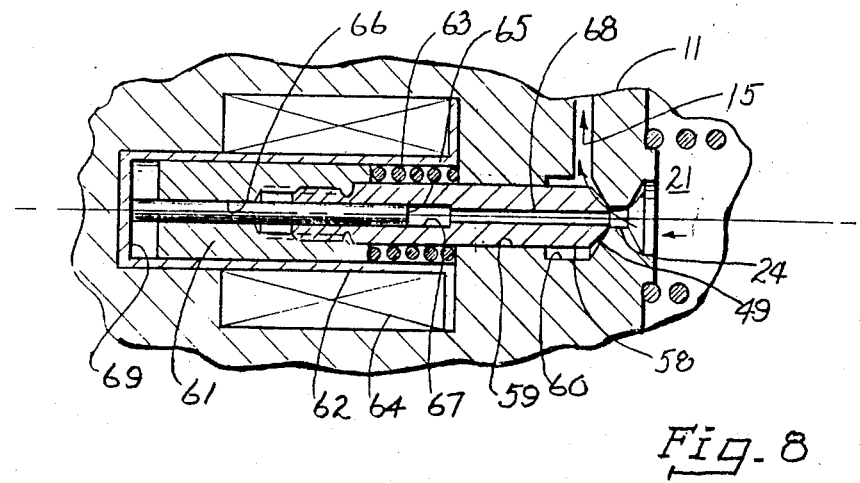
FIG. 8 is a fragmentary cross-sectional, schematic view of a pressure balanced pilot valve mechanism for varying the flow area of the pilot discharge orifice of the mechanism of FIG. 2 in which the pilot valve is driven toward open position by a spring and is driven toward closed position by a solenoid.

In the valve mechanism illustrated in FIG. 8 the flow area of orifice 24 is varied by the position of conical valve element 49 adjacent to the downstream edge of orifice 24. Conical element 49 is formed on the end of rod 58. Rod 58 is held coaxial with orifice 24 by bore 59 in housing 11. Enlarged bore 60 provides the flow path around rod 59 to passage 15. Rod 59 is coaxially coupled to armature 61. Armature 61 is housed in fluid tight sleeve 62. Spring 63 surrounds rod 58 and acts to urge armature 61 to move cone 49 away from orifice 24. When electric current flows through solenoid coil 64 the magnetic force on armature 61 drives it against spring 63. Balance piston 65 slides in bore 66 in armature 61 and bore 67 in rod 58. Passage 68 communicates bore 67 with the pressure in chamber 21 and piston 65 is thereby pressed against the cap 69 of sleeve 62 by the pressure in chamber 21. The diameter of orifice 24 and the diameter of balance piston 65 are so selected that the pressure force on rod 58 is very low. The closing flow force is effectively cancelled by spring 63. The balance system permits the use of a relatively large diameter of orifice 24 and accordingly the maximum lift of the blunt cone 49 away from the edge of orifice 24 is very small. These factors allow the regulated pressure to be substantially linear with solenoid current and to hold the solenoid current relatively low even at pressures as high as 5000 psi.

Figure 9:
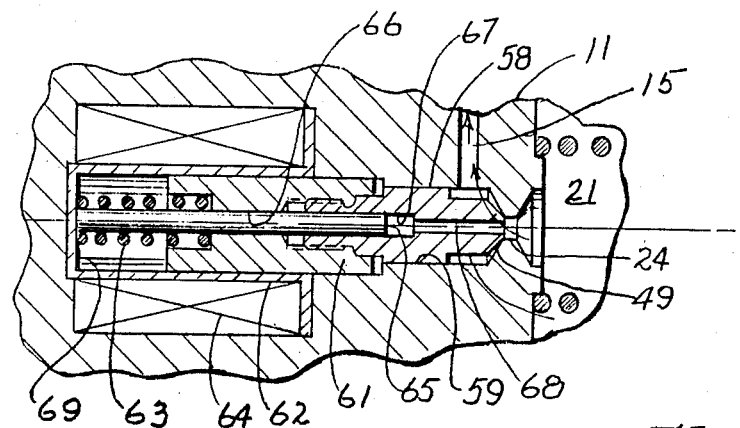
FIG. 9 is a fragmentary cross-sectional, schematic view of a pressure balanced valve mechanisim for varying the flow area of the pilot discharge orifice of the mechanism of FIG. 2 in which the pilot valve is driven toward closed position by a spring and is driven toward open position by a solenoid.

In the valve mechanism illustrated in FIG. 9 rod 58 has a forward section 70 of reduced diameter to provided the flow path from the orifice gap between cone 49 and orifice 24 to passage 15. Spring 63 surrounds balance piston 65 and is compressed between end cap 69 and armature 61, therby providing a closing force. Armature 61 is positioned in solenoid coil 64 so that the magnetic force acts in the opening direction and against spring 63. All other elements bearing the same mumber as in FIG. 8 function in the same manner. As in the mechanism of FIG. 8, the balance piston greatly reduces the pressure force and the flow force combines with the spring force. This mechanism also provides a substantially linear relationship between solenoid current and regulated presssure and the maximum current requirement is approximately the same. The mechanism of FIG. 9 provides maximum system pressure upon loss or turn-off of current, while the mechanism of FIG. 8 provides minimum system pressure on loss or turn-off of current.

Figure 10:
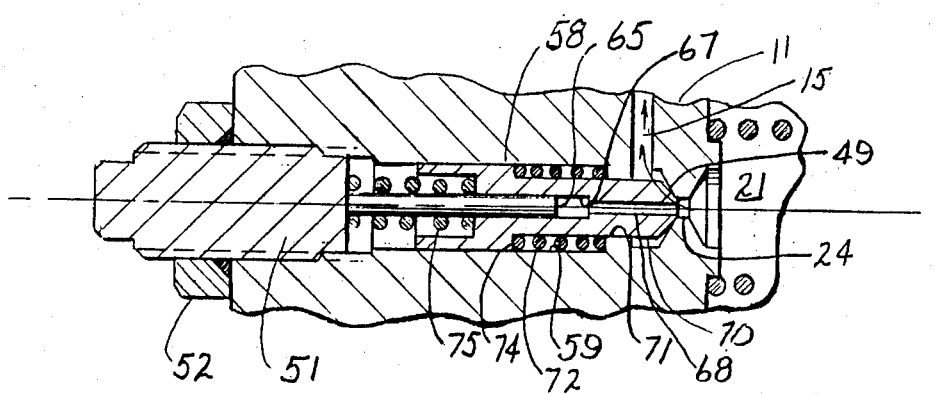
FIG. 10 is a fragmentary cross-sectional, schematic view of a pressure balanced pilot valve mechanism for varying the flow area of the pilot discharge orifice of the mechanism of FIG. 2 in which the pilot valve is driven toward closed position by with a screw adjustable first spring preload and is driven toward open position by a fixed second spring.

FIG. 10 illustrates a screw adjustable spring actuated valve mechanism that has important advantages over the spring and pressure actuated valve mechanism illustrated in FIG. 7. In FIG. 10 rod 58 has a forward section 70 of reduced diameter to provide the flow path from the orifice gap between cone 49 and orifice 24 to passage 15. The rearward section of rod 58 is guided in bore 59 and the forward section passes through bore 71. Spring 72 engages the internal step 73 of housing 11 and shoulder 74 of rod 58 and accordingly, spring 72 biases rod 58 in the opening direction. Spring 75 engages adjusting screw 51 and the recessed end of rod 58 and accordingly drives rod 58 in the closing direction. The pressure balance system is, as indicated, the same as utilized in the mechanisms of Fig.8 and 9. Because of the pressure balance, spring 73 is required to provide the force opposing spring 75. The dual spring configuration also provides a means for a very wide pressure setting range without spring change. The reason for this is that at lowest pressure setting, cone 49 must be withdrawn the maximum distance from orifice 24. In single spring systems such as illustrated in FIG. 7 the spring may become disengaged if the system is shut down with the system set at the lowest pressure setting. This effect is prevented in the system of FIG. 10 by spring 72. It is only necessary to set the bias force provided by spring 72 to a suffiently high value.

Figure 11:
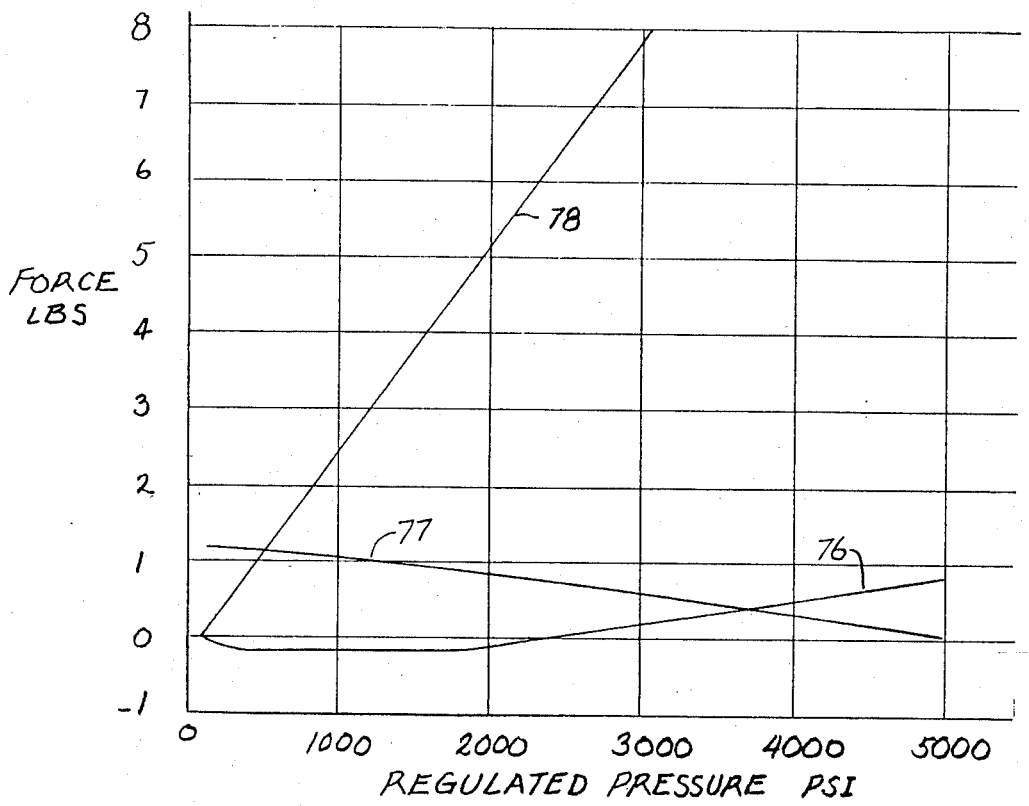
FIG. 11 is a graph illustrating the characteristic variation of applied force with pressure setting that is required with the balanced valve system of FIGS. 8–10 and that which is required with the unbalanced valve system of FIGS. 5–7.

The valve mechanisms illustrated in FIGS. 5 and 6 and FIGS. 8-10 are applicable only to the pressure regulating system illustrated in FIG. 2. They are not applicable to pressure regulating system of FIG. 1 because each provides a valve element that is essentially insensitive to pilot pressure and therefore, in this environment they provide fixed orifices. If they were used with the pressure regulating system of FIG. 1, the pressure regulation droop would be excessive. As has already been shown, the valve mechanism of FIG. 7 is applicable to the system of FIG. 1 and FIG. 2. Nevertheless, the balanced valve system shown in FIGS. 8 and 9 have an important advantage because a large reduction is provided in solenoid force. In this respect, it provides an important advantage over soleniod operation with the pressure regulation system of FIG. 1. FIG. 11 shows the order of magnitude of the reduction in solenoid force that can be accompished by using the balancing principle of FIGS. 8, 9 and 10. In FIG. 11, curve 76 shows the variation with operating presssure of the sum of the pressure and flow forces acting the valve element in a system configured in accordance with FIG. 9. The maximum value of this force is less than 1 pound and becomes slighly negative below 2000 psi. Curve 77 is the soleniod force which is the spring force minus the sum of the pressure and flow forces. The spring force is set to provide a pressure of 5000 psi when the solenoid force is zero and therfore the solenoid force line runs from zero at 5000 psi to a maximum of 1.27 pounds at 100 psi. The solenoid force curve is slightly bowed from linear by the small negative unbalance below 2000 psi. This non-linearity is of no significance. The negative force shown is the result the of valve properties that are characteristic of the cone-orifice valve geometery. Line 78 represents the solenoid force that would be required with an equivalent flow and an unbalanced valve, spring biased to 5000 psi.

Figure 12:
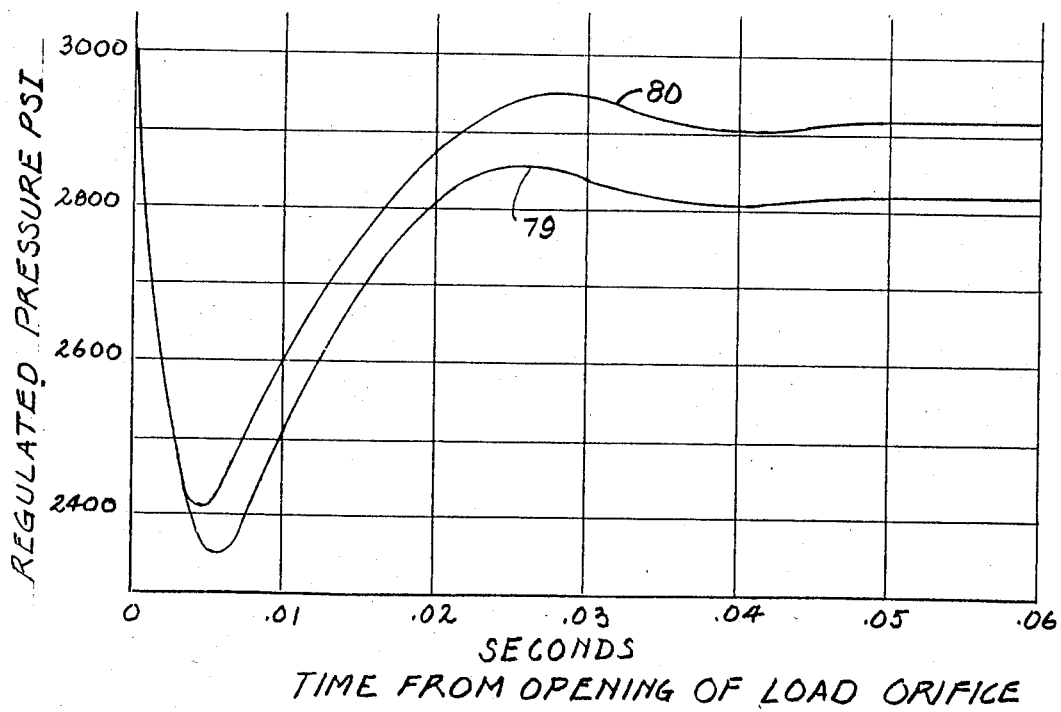
FIG. 12 is a graph illustrating the transient response of the pressure regulator of this invention, utilizing the pilot discharge orifice mechanism shown in FIG. 7, to a very large and sudden increase in load flow; and the transient response to the same disturbance of a regulator of the prior art, utilizing an identical pilot discharge orifice mechanism.

FIG. 12 shows the transient response of a two stage pressure regulator utilizing a pilot with an inlet orifice and a spring loaded pilot discharge valve of the state of the art valve of FIG. 1 (line 79); and the transient response of a two stage pressure regulator utilizing a pilot with an inlet flow regulator and a spring loaded pilot discharge valve of FIGS. 2 and 7 (line 80). The results were obtained with a 50 gpm pump, controlled by the pressure regulator and discharging into an orifice load. Prior to each run, the load orifice was closed and the regulator was adjusted to 3000 psi. The load orifice was then snapped open to an area that would flow 40 gpm at 3000 psi. The greater droop of line 79 is evident throughout the transient. These results also demonstrate that with a pilot inlet flow regulator, the droop is not increased through the use of a spring loaded pilot stage.

In both cases the pilot discharge valve was configured according to FIGS. 1 and 7.

The pressure regulators with the solenoid controlled pilots can be used as on-off valves simply by switching the electric current from a relatively high current to off or switching in the opposite order. If the solenoid system of FIG. 8 is employed, piston 16 (FIG. 2) will be in the open position when the current is zero and will be in the closed position when the current is high. If the solenoid system of FIG. 9 is employed, piston 16 will be in the closed position when the current is zero and will be in the open position when the current is high.

Figure 13:
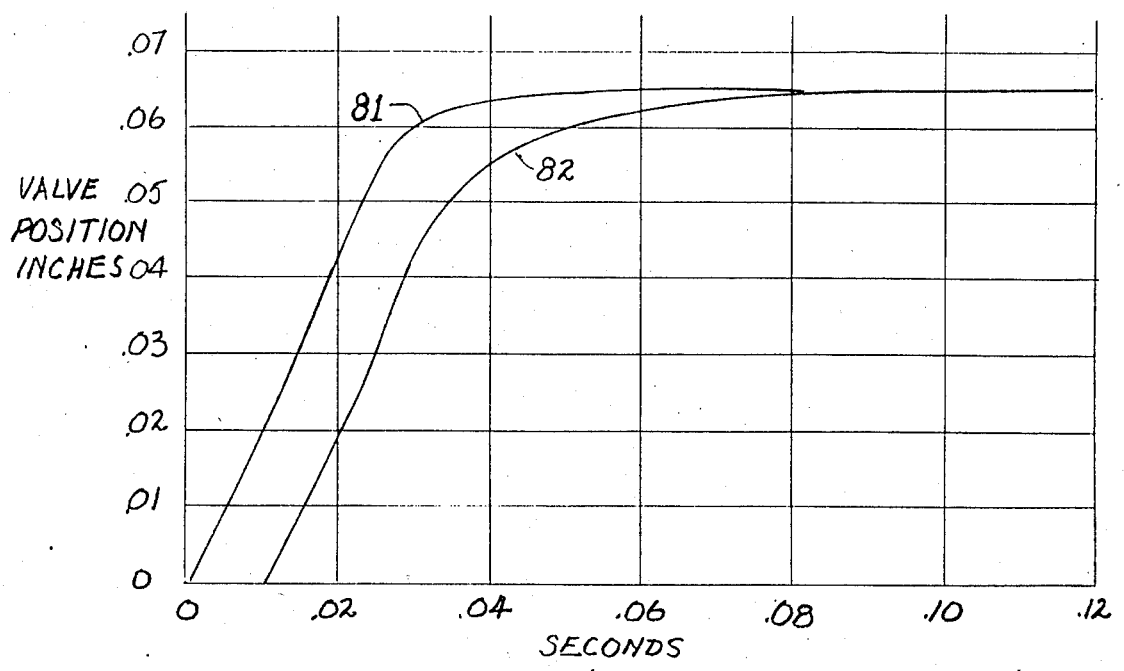
FIG. 13 is a graph illustrating a charcteristic comparason of the opening transients of a solenoid driven on-off valve having a two orifice pilot and of the solenoid configuration of the pressure regulator of this invention in an on-off mode.
Figure 14:
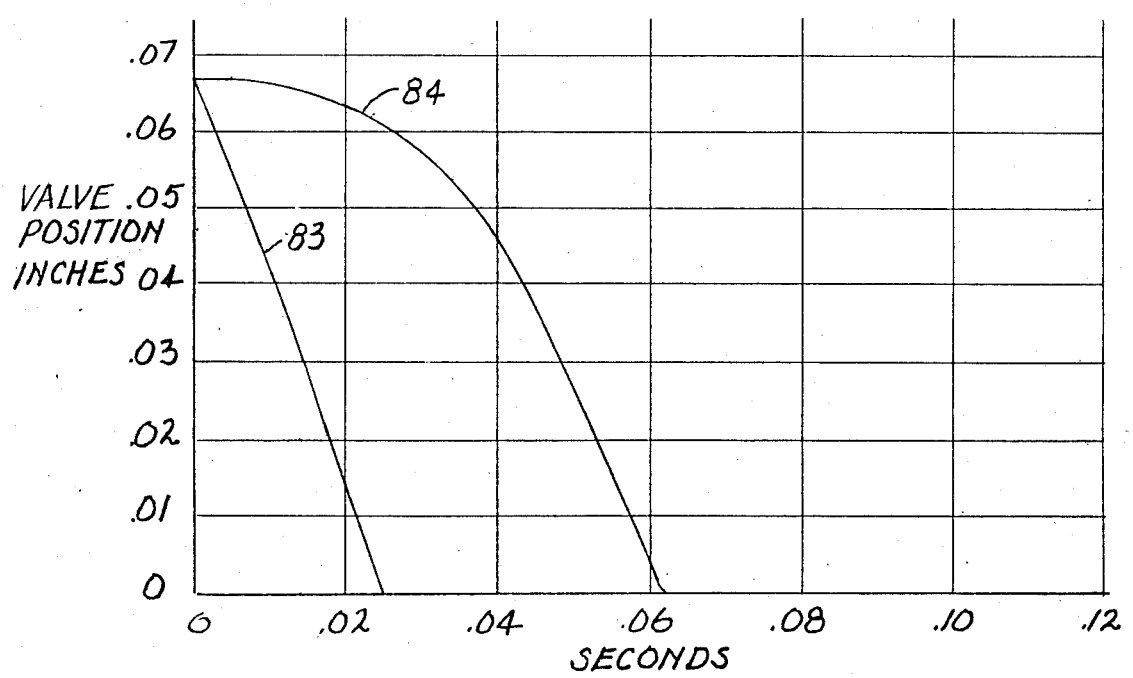
FIG. 14 is a graph illustrating a characteristic comparason of the closing transients of a solenoid driven on-off valve having a two orifice pilot and of the solenoid configuration of the pressure regulator of this invention in an on-off mode.

FIGS. 13 and 14 show the opening and closing transient characteristics, respectively, of a system that utilizes the solenoid system of FIG. 9. As in the previous transients, flow was delivered to bore 12 by a positive displacement pump and a fixed orifice bleed was used to limit the pressure when the solenoid valve was closed. In the transient shown in FIG. 13, the initial solenoid current is zero and cone 49 is seated on the edge of orifice 24, piston 16 is seated on shoulder 17 and piston 29 is at its furthest open position with its wall 37 pressed against wall 44. The bleed orifice held the pressure in bore 12 at 2000 psi. The transient starts after the solenoid current is switched to 300 milliampers. The curve 81 in FIG. 13 is the variation with time from current turn on, of the displacement of piston 16 from seating. Curve 82 is the same parameter, but is produced by a pilot system that utilizes a fixed pilot inlet orifice. The solenoid system and piston 16 are identical in the two cases. The pilot inlet orifice was sized to flow the same flow rate as that controlled by the pilot flow regulator at the mid pressure of the transient, 1000 psi. The significantly more rapid operation provided by the use of the pilot flow regulator is clearly evident. The reason for the faster response is atributable to the flow regulator action which in limiting pilot flow rate caused the pressure in chamber 21 to decay more rapidly.

FIG. 14 shows the same parameters in a closing transient. In this case the current was switched from 300 milliamperes to zero. The rod 58 is driven to seating very early in the transient and consequently in most of the transient the velocity of piston 16 is limited by the rate of pilot flow into chamber 21. Curve 83 is the response of the system with the pilot flow regulator of FIG. 2; and curve 84 is that of the state of the art system with the pilot inlet orifice of FIG. 1. The improvement shown reduces the closure time to less than one half. It can be seen that the velocity limit is approximately the same for both cases, but that the acceleration to that velocity is much greater in the pilot flow regulator case. The greater acceleration results from the pilot flow regulator being driven to maximum opening prior to piston 16 reaching the velocity limit. In so doing it offers very little flow resistance until the velocity corresponds to the regulator flow setting.

Having described specific preferred embodiments of the invention, the following is claimed:

1. A two stage system pressure limiting valve assembly comprising a flow regulating member interposed between a source of pressure and an exhaust means and projecting with one end into a control chamber, spring biasing means operable to bias said flow regulating member towards position isolating said source of pressure and said exhaust means, said regulating member being thereby directly operable to be responsive to said spring bias, the pressure in said source of pressure and the pressure in said control chamber, first orifice forming means interconnecting said source of pressure and said control chamber, said chamber having system pressure responsive flow regulating means operable to control flow through said first orifice forming means at a predetermined and constant level, second orifice forming means having flow area means positioned between said control chamber and said exhaust means, said flow area means being operable to be unresponsive to the pressure in said control chamber and to the pressure in said source of pressure, whereby the flow area set by said flow area means remains constant under variation of said control chamber pressure and said pressure in said source of pressure, and unrestricted flow passage means between said flow are means and said exhaust means, said exhaust means being passively funcitonal to hold the pressure in said exhaust means constant, at or near atmospheric pressure.

2. A two stage pressure limiting valve assembly as set forth in claim 1 wherein said second flow area means includes a circular orifice and a control member, said control member having a variable cross-sectional area protuding through said circular orifice and forming an annular orifice.

3. A two stage pressure limiting assembly as set forth in claim 2 wherein said control member has adjusting means operable to displace said control member in respect to said circular orifice, whereby the area of said annular orifice can be varied.

4. A two stage system pressure limiting valve assembly as set forth in claim 3 wherein said adjusting means includes lead screw means.

5. A two stage system pressure limiting assembly as set forth in claim 4 wherein said lead screw means includes a stepper motor means for electrical rotation of said screw means.

6. A two stage system pressure limiting assembly as set forth in claim 1 wherein said second flow area means includes a stepper motor driven flow area adjusting means.

7. A two stage system pressure liniting assembly as set forth in claim 1 wherein said second orifice forming means includes an electro-magmetic force generating means, an opposing spring biasing means and a pressure balancing means operable to make the flow area of said orifice forming means unresponsive to the pressure in said control chamber.

8. In a pilot operated pressure regulating valve comprising a regulating valve memeber directly responsive to the regulated pressure and to the pilot pressure and in which the pilot system comprises a pilot inlet flow regulator means and a discharge orifice means, and in which the pressure generated between said flow regulator means and said discharge orifice means provides the control pressure for direct operation of said pressure regulating valve, said flow regulator having a fixed sensing orifice, a pressure responsive throttling valve and a fixed bias spring, said throttling valve being responsive in the opening direction to the force of said spring and to the pressure downstream of said sensing orifice and being responsive in the closing direction to the pressure upstream of said sensing orifice, said discharge orifice means discharging freely into an exhaust means, said exhaust means being passively functional to maintain the pressure downstream of said discharge orifice means constant, at or near atmospheric pressure, the improvement wherein said discharge orifice means includes a discharge valve means unresponsive to said control pressure and to said regulated pressure, whereby said discharge valve means is effectively a fixed orifice at each setting of said discharge valve means and the regulated pressure can thereby be set at any value between a very low pressure and the structurally limited pressure.

* * * * *